(12) United States Patent
Pontone (10) Patent No.: US 11,911,985 B2
(45) Date of Patent: Feb. 27, 2024

(54) APPLICATION SYSTEM AND METHOD FOR APPLYING A SEALING AGENT TO THE INNER SURFACE OF A PNEUMATIC TIRE

(71) Applicant: Bridgestone Europe NV/SA [BE/BE], Zaventem (BE)

(72) Inventor: Roberto Pontone, Rome (IT)

(73) Assignee: Bridgestone Europe NV/SA, Zaventem (BE)

( * ) Notice: Subject to any disclaimer, the term of this patent is extended or adjusted under 35 U.S.C. 154(b) by 401 days.

(21) Appl. No.: 17/413,330

(22) PCT Filed: Jan. 22, 2020

(86) PCT No.: PCT/IB2020/050488
§ 371 (c)(1),
(2) Date: Jun. 11, 2021

(87) PCT Pub. No.: WO2020/152596
PCT Pub. Date: Jul. 30, 2020

(65) Prior Publication Data
US 2022/0016859 A1    Jan. 20, 2022

(30) Foreign Application Priority Data
Jan. 25, 2019   (IT) .................. 102019000001153

(51) Int. Cl.
*B29D 30/06*   (2006.01)
(52) U.S. Cl.
CPC .. *B29D 30/0685* (2013.01); *B29D 2030/0694* (2013.01)
(58) Field of Classification Search
CPC ............... B29D 30/00; B29D 30/0685; B29D 2030/0694
See application file for complete search history.

(56) References Cited

U.S. PATENT DOCUMENTS 4,398,492 A * 8/1983 Casey ................ B29D 30/0633
118/107

FOREIGN PATENT DOCUMENTS

EP        0080968 A2    6/1983
WO    2009105108 A1    8/2009

OTHER PUBLICATIONS

International Searching Authority: International search report dated Apr. 14, 2020 for corresponding International Patent Application No. PCT/IB2020/050488, 3 pages.

* cited by examiner

*Primary Examiner* — Joseph S Del Sole
*Assistant Examiner* — Jamel M Nelson
(74) *Attorney, Agent, or Firm* — Patterson Intellectual Property Law, P.C.

(57) ABSTRACT

An application system and method for applying a sealing agent to the inner surface of a pneumatic tire includes: rotating, by means of a support device, the pneumatic tire about an axis of rotation; applying a layer of sealing agent to the inner surface of the pneumatic tire by means of a dispensing head arranged within the pneumatic tire itself; pressing, by means of a pressure roller, the just applied layer of sealing agent against the inner surface of the pneumatic tire; pushing the pressure roller against the just applied layer of sealing agent by means of an actuator which generates a force having a desired value; determining, by means of a force sensor, a measured value of the force generated by the actuator; and cyclically varying the force generated by the actuator as a function of the measured value of the force.

20 Claims, 5 Drawing Sheets

APPLICATION SYSTEM AND METHOD FOR APPLYING A SEALING AGENT TO THE INNER SURFACE OF A PNEUMATIC TIRE

TECHNICAL SECTOR

The present invention relates to an application system and method for applying a sealing agent to the inner surface of a pneumatic tire.

PRIOR ART

In recent years pneumatic tire development has been directed towards pneumatic tires with an inner lining that is manufactured with a sealing agent that is intended to seal any punctures. Normally, the sealing agent has a high viscosity in order to ensure both a sealing action in relation to any holes and its stability within the inner cavity regardless of the conditions of the pneumatic tire.

The sealing agent is applied to a pre-vulcanized pneumatic tire in the area of the pneumatic tire that comes into contact with the road (i.e. the area of the pneumatic tire wherein punctures can potentially occur). In particular, the sealing agent is applied at the tread and partially at the sidewalls.

In a known sealing agent application system, such as that described, for example, in the patent application EP0080968A1 or else in the patent U.S. Pat. No. 4,398,492A1, a sealing agent applicator device is inserted into the pre-vulcanized pneumatic tire; the applicator device comprises an arm which is movable axially and supports at one end a dispensing head wherefrom a strip of sealing agent emerges. The pneumatic tire is rotated upon itself (typically by means of the motorized rollers whereupon the pneumatic tire rests) and the dispensing head carried by the arm is moved axially from one side of the pneumatic tire to the opposite side of the pneumatic tire in order to deposit upon the inner surface a spiral of sealing agent that covers the inner surface itself (i.e., the application of the sealing agent has a helical progression).

To ensure both greater uniformity of the layers of sealing agent, and better adhesion of the layer of sealing agent to the inner surface of the pneumatic tire, it has been proposed to mount a pressure roller upon the dispensing head, which is arranged upstream of the dispensing head in relation to the direction of rotation of the pneumatic tire and which presses the just deposited layer of sealing agent against the inner surface of the pneumatic tire. The pressure roller is mounted movable in order to be able to move in a radial direction (i.e., perpendicular to the inner surface of the pneumatic tire) and is constantly pressed against the just deposited layer of sealing agent by the action of a spring having a predetermined load; in this way, the pressure roller is suitable for adapting itself to the shape of the layer of sealing agent and the shape of the inner surface of the pneumatic tire in pressing against the layer of sealing agent with a force that is roughly constant and equal to a desired predetermined value.

It was however observed that in known application systems the actual force, wherewith the pressure roller presses against the layer of sealing agent, may have deviations that are also significant compared to the desired value (especially when the rotational speed of the pneumatic tire is increased in order to reduce the period of time necessary to complete the sealing agent application cycle), and therefore it is not always possible to obtain high uniformity of the layer of sealing agent.

DESCRIPTION OF THE INVENTION

The object of the present invention is to provide an application system and method for applying a sealing agent to the inner surface of a pneumatic tire, which application system and method are free of the drawbacks described above and, in particular, are of easy and economical manufacture.

According to the present invention an application system and method for applying a sealing agent to the inner surface of a pneumatic tire are provided, according to what is set forth in the attached claims.

The claims describe preferred embodiments of the present invention forming an integral part of the present description.

BRIEF DESCRIPTION OF THE DRAWINGS

The present invention will now be described with reference to the attached drawings, illustrating, but not limited to, an exemplary embodiment, wherein.

PREFERRED EMBODIMENTS OF THE INVENTION

Figure 1:
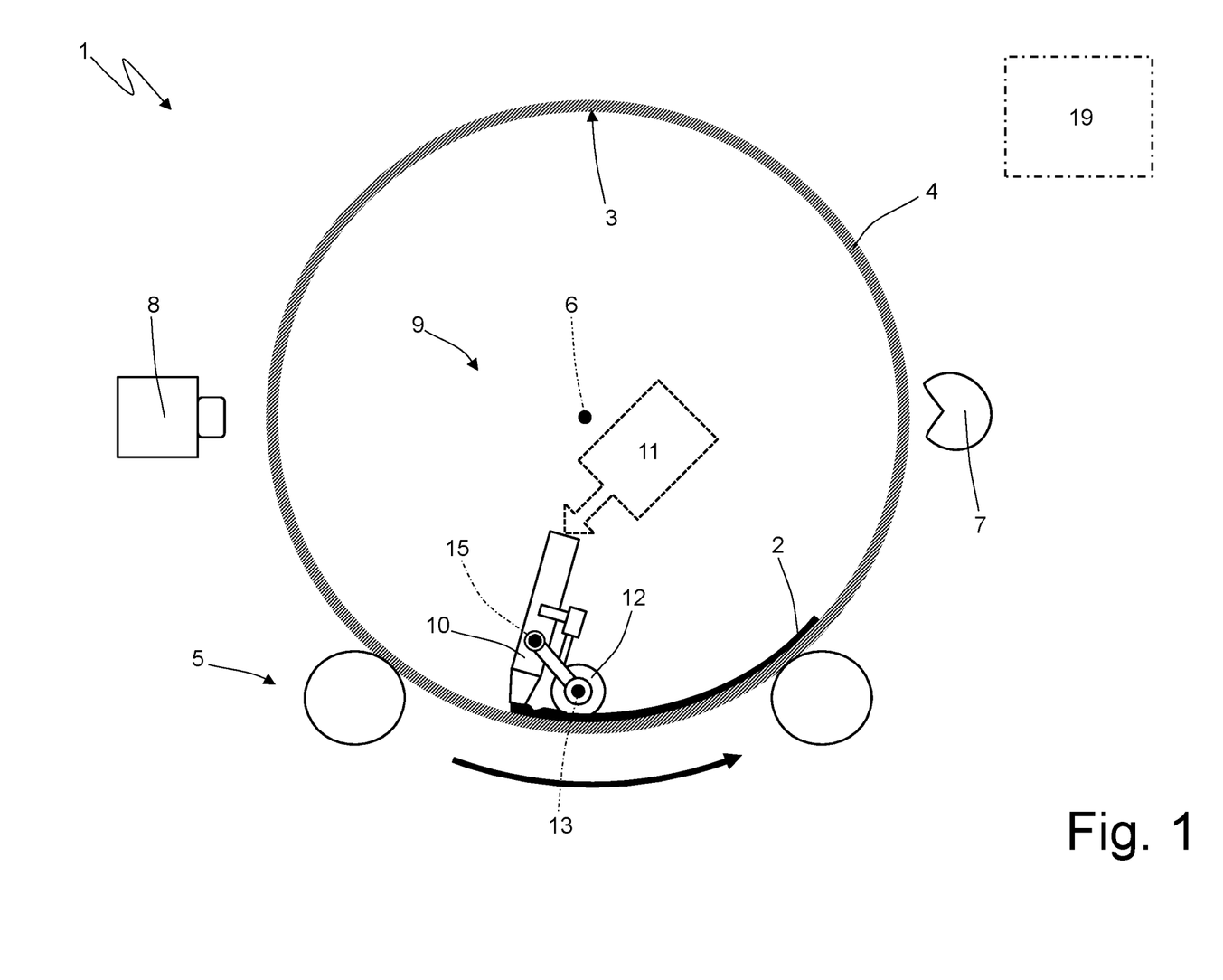
FIG. 1 is a schematic side view, with parts removed for clarity, of an application system manufactured in accordance with the present invention.

In FIG. 1, the numeral 1 denotes, in the entirety thereof, a first application system 1 for the application of a sealing agent 2 to (at least) part of the inner surface 3 of a pneumatic tire 4. In other words, the pneumatic tire 4 has a toroidal shape bounded by an outer surface and by the inner surface 3 opposite the outer surface and the sealing agent 2 is applied to (at least) part of the inner surface 3; generally the sealing agent 2 is applied to the inner surface 3 arranged at the tread and to part of the inner surface 3 arranged at the lateral parts (i.e., within those areas where punctures may normally occur).

The application system 1 comprises a support device 5 which is suitable for supporting the pneumatic tire 4 arranged in a vertical position and is also suitable for bringing the pneumatic tire 4 into rotation about an axis of rotation 6 coinciding with the central axis of symmetry. Normally, the support device 5 comprises side rails (not illustrated) which hold the pneumatic tire 4 stable in the vertical position and comprises motorized rollers (illustrated schematically) whereupon the pneumatic tire 4 rests and is driven.

The application system 1 comprises a position sensor 7 which is suitable for determining the angular position α of the pneumatic tire 4 about the axis 6 of rotation; the position sensor 7 may, for example, be an angular encoder coupled to one of the motorized rollers of the support device 5, or else the position sensor 7 may directly read the displacement of the pneumatic tire 4.

The application system 1 comprises a camera 8 which faces the outer surface of the pneumatic tire 4 at a side wall and is suitable for reading a graphical identification code (typically a bar code or similar) which is applied to the side wall itself; in pneumatic tires 4, the graphical identification code is always applied in the same position (also in the same angular position), and therefore, when the camera 8 detects the presence of the graphical identification code, the corresponding angular position α is contextually determined of the pneumatic tire 4 about the axis 6 of rotation in order to obtain an absolute angular reference of the angular position α of the pneumatic tire 4 about the axis 6 of rotation.

The application system 1 comprises an applicator unit 9 of the sealing agent 2 that deposits a strip of sealing agent 2 upon the inner surface 3 of the pneumatic tire 4. The applicator unit 9 comprises a dispensing head 10, wherefrom a strip of sealing agent 2 is dispensed that is deposited upon the inner surface 3 of the pneumatic tire 4, and a movement device 11 (for example a robotic arm) which supports and moves the dispensing head 10: at the beginning and at the end of the application, the movement device 11 moves the dispensing head 10, respectively, inside the pneumatic tire and outside the pneumatic tire 4, whilst, during the application, the movement device 11 moves the dispensing head 10 axially (i.e., parallel to the axis 6 of rotation) from one side of the pneumatic tire 4 to the opposite side of the pneumatic tire 4 in order to deposit upon the inner surface 3 a spiral of sealing agent 2 that covers the inner surface 3 itself (i.e., the application of the sealing agent 2 has a helical progression).

The dispensing head 10 is connected (typically by means of a flexible pipe) to a feeder of sealing agent 2 comprising (at least) a reservoir of the sealing agent 2 and a pumping body which draws the sealing agent 2 from the reservoir and feeds it under pressure to the dispensing head 10.

A pressure roller 12, which is arranged upstream of the dispensing head 10 in relation to the direction of rotation of the pneumatic tire 4, is mounted upon the dispensing head 10 and presses the just deposited layer of sealing agent 2 against the inner surface 3 of the pneumatic tire 4; the function of the pressure roller 12 is to ensure both greater uniformity of the layer of sealing agent 2, and better adhesion of the layer of sealing agent 2 to the inner surface 3 of the pneumatic tire 4.

According to a preferred embodiment, the outer surface of the pressure roller 12 is coated by means of a low-adhesion material (for example, a non-stick Teflon® coating or similar). According to a preferred embodiment, the outer surface of the pressure roller 12 is heated to a predetermined temperature, for example by means of electrical resistances arranged with the pressure roller 12. The combination of the non-stick coating and the heating prevents the sealing agent 2 from attaching to the outer surface of the pressure roller 12.

Figure 2:
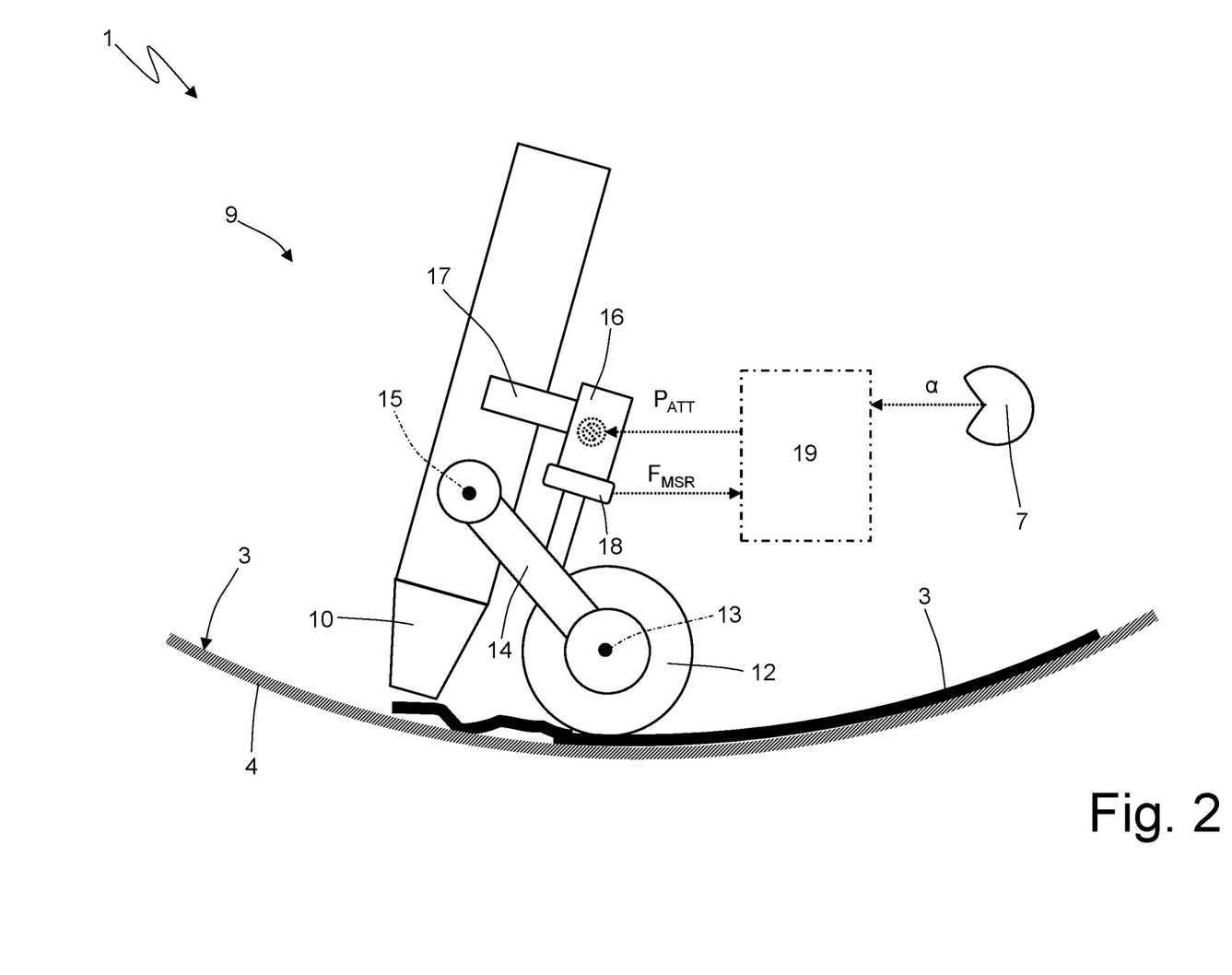
FIG. 2 is an enlarged scale view of a detail of FIG. 1.

As shown more clearly in FIG. 2, the pressure roller 12 is mounted rotating about an axis 13 of rotation (coinciding with the central axis of symmetry of the pressure roller 12 and parallel to the axis 6 of rotation of the pneumatic tire 4) and is free, i.e., it rotates freely about the axis 13 of rotation. Furthermore, the pressure roller 12 is mounted movable in order to move (translate) in a radial direction (i.e., perpendicular to the inner surface 3 of the pneumatic tire 4 and perpendicular to the axis 6 of rotation of the pneumatic tire 4); in particular, the pressure roller 12 is hinged at one end of a support arm 14 in order to rotate about the axis of rotation 13 whilst the other end of the support arm 14 (i.e., the end of the support arm 14 opposite the pressure roller 12) is freely hinged at the dispensing head 10 in order to freely rotate, with respect to the dispensing head 10 itself, about an axis 15 of rotation parallel to the axis 13 of rotation of the pressure roller 12 (and therefore parallel to the axis 6 of rotation of the pneumatic tire 4).

A pneumatic spring 16 is provided (i.e., a gas spring wherein the elastic force is generated by a gas under pressure) that pushes against the pressure roller 12 in order to constantly press the pressure roller 12 itself against the just deposited layer of sealing agent 2. The load (i.e. the elastic force) generated by the pneumatic spring 16 is electrically adjustable; in other words, the load (i.e. the elastic force) generated by the pneumatic spring 16 is not constant but can be adjusted as required, acting upon an integrated electrical actuator within the pneumatic spring 16. According to a preferred, but not binding, embodiment, a fixed part of pneumatic spring 16 is rigidly attached to the dispensing head 10 by means of a bracket 17 whilst a movable part (i.e. a piston) of the pneumatic spring 16 pushes against the support arm 14.

A force sensor 18 is coupled to the pneumatic spring 16 (for example a load cell) which is suitable for measuring the force F which is exerted by the spring 16 (directly) upon the support arm 14 and therefore the force F that is applied (indirectly) to the pressure roller 12. According to a different and perfectly equivalent embodiment, the force sensor 18 is integrated into the pressure roller 12 (for example, within the bearings of the pressure roller 12) in order to directly measure the force F that is applied to the pressure roller 12.

The application system 1 comprises a control unit 19 which is suitable for controlling the force F that is exerted by the pneumatic spring 16 upon the pressure roller 12 (i.e., upon the support arm 14) in such a way as to maintain the force F as much as possible equal to a predetermined desired value $F_{DES}$ (which is generally constant and varies as a function the type of pneumatic tire 4 and as a function of the type of sealing agent 2). In particular, the control unit 19 cyclically supplies the pneumatic spring 16 (i.e., the electrical actuator of the pneumatic spring 16) with an actuation value $P_{ACT}$ which corresponds, for example, to the desired pressure of the gas within the pneumatic spring 16. In other words, the control unit 19 cyclically varies (if necessary) the actuation value $P_{ACT}$ wherewith the electrical actuator of the pneumatic spring 16 is driven in order to follow the desired value $F_{DES}$ of the force F which is exerted by the pneumatic spring 16 upon the pressure roller 12 (i.e., upon the support arm 14).

Figure 3:
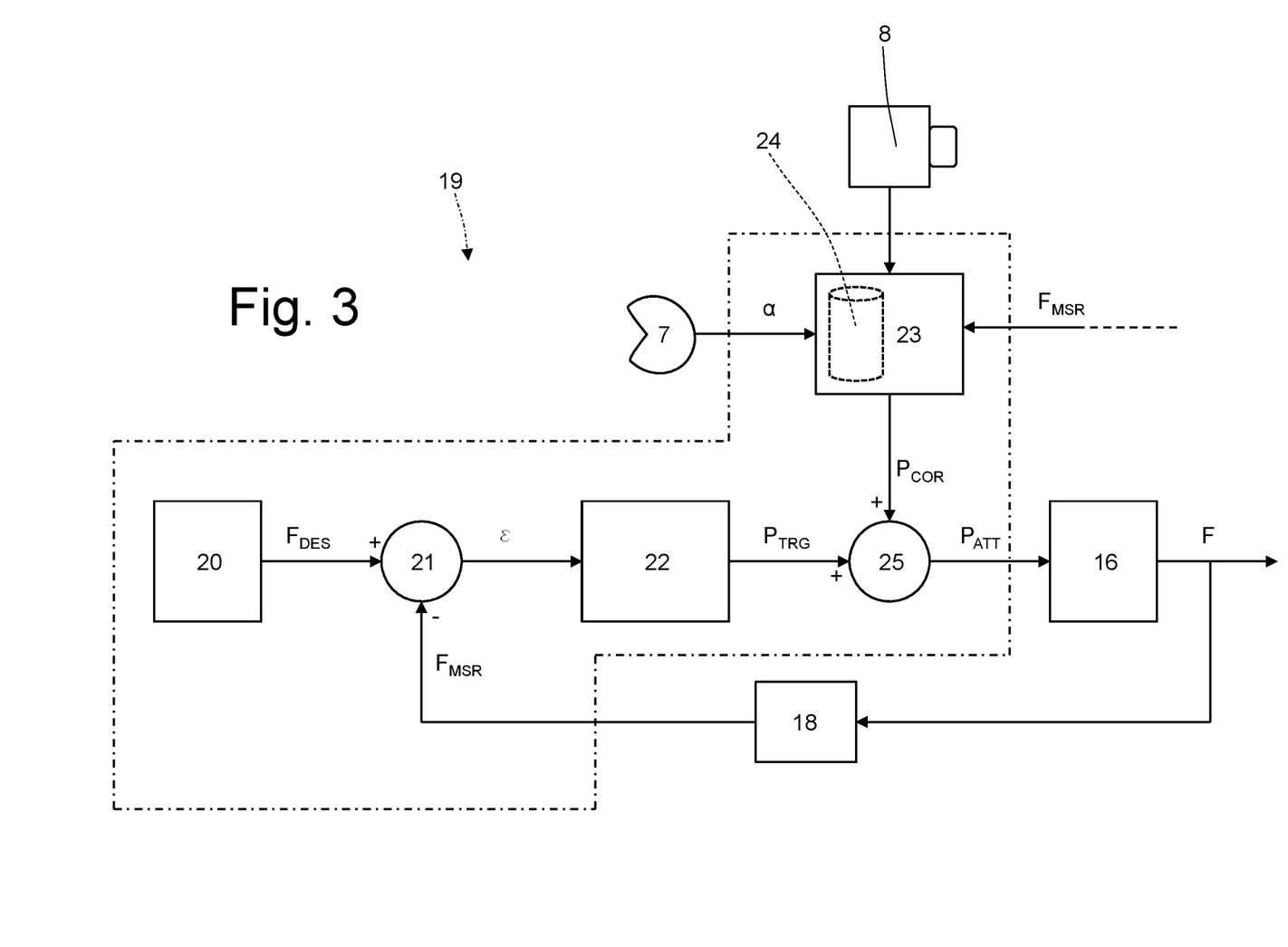
FIG. 3 is a block diagram which describes the control logic implemented within a control unit of the application system of FIG. 1.

As illustrated in FIG. 3, the control unit 19 implements a feedback control over the force F which is exerted by the pneumatic spring 16 upon the pressure roller 12 (i.e., upon the support arm 14) in such a way as to follow the predetermined desired value $F_{DES}$, i.e., in such a way that the measured (by the force sensor 18) value $F_{MSR}$ of the force F which is exerted by the pneumatic spring 16 upon the pressure roller 12 is, as far as possible, identical to the predetermined desired value $F_{DES}$ of the force F which is exerted by the pneumatic spring 16 upon the pressure roller 12.

In the embodiment illustrated in FIG. 3, the control unit 19 comprises a memory block 20 that provides the desired value $F_{DES}$ of the force F which is exerted by the pneumatic spring 16 upon the pressure roller 12; generally the desired value $F_{DES}$ is constant and varies only upon change of the type of pneumatic tire 4, the type of sealing agent 2 and, possibly, the thickness of the layer of sealing agent 2 deposited upon the inner surface 3 of the pneumatic tire 4.

The control unit 19 comprises a subtracter block 21 which calculates a force error ε in calculating the difference between the desired value $F_{DES}$ of the force F which is exerted by the pneumatic spring 16 upon the pressure roller 12 and the measured (by the force sensor 18) value $F_{MSR}$ of the force F which is exerted by the pneumatic spring 16 upon the pressure roller 12.

The control unit 19 comprises a control block 22 (typically a PID controller), which, as a function of the force error ε determines an target value $P_{TRG}$ that is used to drive the electrical actuator of the pneumatic spring 16.

The control unit 19 comprises a calculation block 23, which determines a correction value $P_{COR}$ as a function of the angular position α (determined by the position sensor 7) of the pneumatic tire 4 about the axis 6 of rotation. According to a preferred embodiment, the correction value $P_{COR}$ provided by the calculation block 23 is variable as a function of the angular position α (determined by the position sensor 7) of the pneumatic tire 4 about the axis 6 of rotation and thus makes it possible to take into account asymmetries of the pneumatic tire 4 (for example due to the cyclic alternation of full and empty spaces in the tread pattern or the presence of junctions). According to a preferred embodiment, the calculation block 23 comprises a memory 24 wherein a plurality is stored of possible progressions of the correction value $P_{COR}$ as a function of the angular position α.

According to a preferred embodiment, each progression of the correction value $P_{COR}$, as a function of the angular position α stored in the memory 24, is also associated with a corresponding progression of the measured value $F_{MSR}$ of the force F as a function of the angular position α; using a recognition system (based, for example, on artificial intelligence algorithms such as artificial neural networks), the calculation block 23 identifies amongst all of the possible progressions of the measured value $F_{MSR}$, as a function of the angular position α stored in the memory 24, the progression of the measured value $F_{MSR}$ that most closely resembles the progression of the measured value $F_{MSR}$ provided in real time by the force sensor 18 and subsequently utilizes the associated progression of the correction value $P_{COR}$. In other words, each progression of the correction value $P_{COR}$, stored in the memory 24, is characterized by a corresponding progression of the measured value $F_{MSR}$, and thus, the calculation block 23 chooses the correction value $P_{COR}$ having the progression of the measured value $F_{MSR}$ that is most similar to the progression of the measured value $F_{MSR}$, provided in real time by the force sensor 18. Over time, the memory 24 of the calculation block 23 is progressively loaded with new progressions of the correction value $P_{COR}$, becoming gradually more and more "expert". According to a possible embodiment, the calculation block 23 may also determine the progression of the correction value $P_{COR}$, to be provided externally by means of the mathematical interpolation of two or more progressions of the correction value $P_{COR}$ stored in the memory 24 and having the associated progressions of the measured value $F_{MSR}$ that are similar to the progression of the measured value $F_{MSR}$ provided in real time by the force sensor 18.

According to a different embodiment, only progressions of the correction value $P_{COR}$, as a function of the angular position α, are stored within the memory 24 (i.e., the corresponding progressions of the measured value $F_{MSR}$ are not present), and in this case the calculation block 23 chooses the progression of the correction value $P_{COR}$ to be supplied externally as a function of the type of pneumatic tire 4, as a function of the type of sealing agent 2 and as a function of the thickness of the layer of sealing agent 2 deposited upon the inner surface 3 of the pneumatic tire 4.

The control unit 19 comprises an adder block 25, which calculates the actuation value $P_{ACT}$, in summing (algebraically, i.e., taking account of the sign) the target value $P_{TRG}$ supplied by the control block 22 and the correction value $P_{COR}$ supplied by the calculation block 23.

In other words, the target value $P_{TRG}$ supplied by the control block 22 is corrected by the correction value $P_{COR}$ supplied by the calculation block 23 in order to determine the actuation value $P_{ACT}$ that is supplied to the pneumatic spring 16, or that is used to drive the electrical actuator of the pneumatic spring 16.

According to a different embodiment not illustrated, the blocks 24 and 25 are absent, and therefore the actuation value $P_{ACT}$ that is used to drive the electrical actuator of the pneumatic spring 16 is supplied directly by the control block 22, i.e., the actuation value $P_{ACT}$ coincides with the target value $P_{TRG}$ supplied by the control block 22 insofar as the correction value $P_{COR}$ is absent.

In summary, the control unit 19 receives the angular position α (determined by the position sensor 7) of the pneumatic tire 4 about the axis 6 of rotation and the measured value $F_{MSR}$ (determined by the force sensor 18) of the force F which is exerted by the pneumatic spring 16 upon the pressure roller 12 and combines these quantities within a predictive model of application of the sealing agent 2 that is processed by an artificial intelligence algorithm in order to determine the actuation value $P_{ACT}$ wherewith the electrical actuator of the pneumatic spring 16 is driven.

Figure 4:
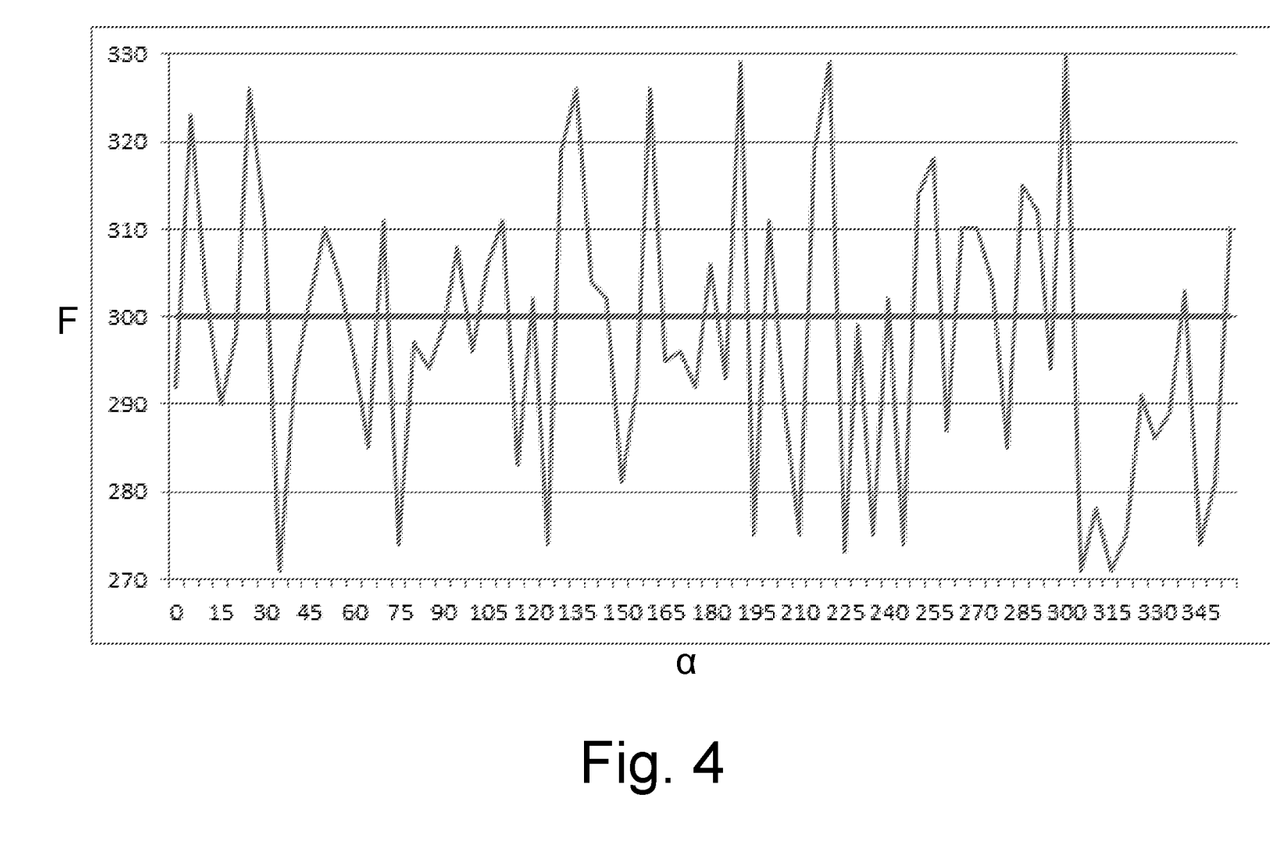
FIGS. 4 and 5 are two graphs which show, as a function of the angular position of the pneumatic tire, the progression of an effective force wherewith a pressure roller of the application system of FIG. 1 presses against a just applied layer of sealing agent.
Figure 5:
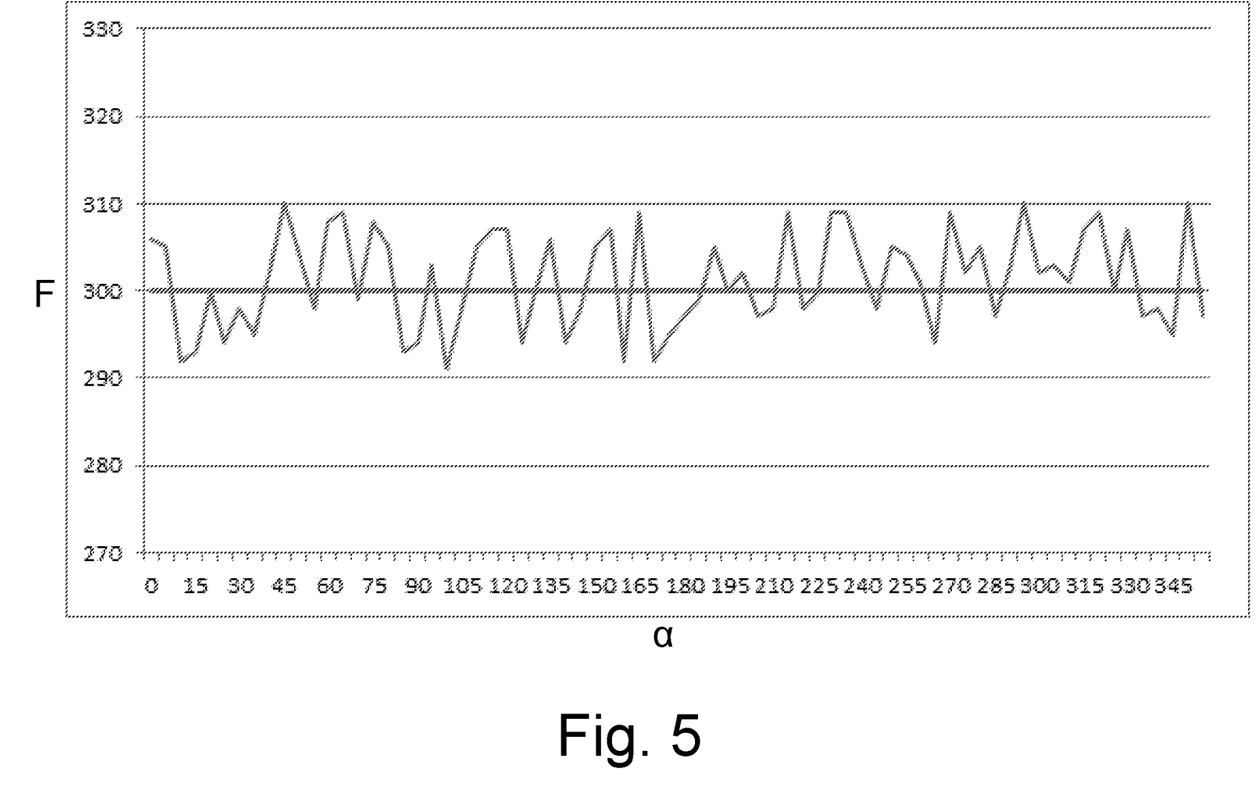

In FIGS. 4 and 5 the results are illustrated of two experimental acquisitions of the measured value $F_{MSR}$ (determined by the force sensor 18) of the force F which is exerted by the pneumatic spring 16 upon the pressure roller 12 as a function of the variation (from 0° to 360°) of the angular position α (determined by the position sensor 7) of the pneumatic tire 4 about the axis 6 of rotation. In the acquisition of FIG. 4, the control method described above was inactive and it can therefore be seen that the force F, which is exerted by the pneumatic spring 16 upon the pressure roller 12, has a variation of about ±10%; by contrast, in the acquisition of FIG. 5, the control method described above was active and it can therefore be seen that the force F, which is exerted by the pneumatic spring 16 upon the pressure roller 12, has a variation of about ±3% with a net improvement (i.e., the variability of the force F is reduced to a third).

According to another embodiment not shown, the pneumatic spring 16 is replaced by another type of actuator device (pneumatic or also of another kind) that is capable of applying a variable and electrically adjustable force F to the pressure roller 12.

The embodiments described herein can be combined with each other without departing from the scope of protection of the present invention.

The application system 1 described above has many advantages.

In the first place, the application system 1 described above makes it possible to substantially reduce (to about one third, as seen from the comparison of the acquisitions shown in FIGS. 4 and 5) the variation of the force F which is exerted by the pneumatic spring 16 upon the pressure roller 12 during the application of the layer of sealing agent 2. Hence, the application system 1 described above makes it possible to implement a very uniform application (in terms of the thickness and width of the bead of sealing agent 2 to the inner surface 3 of the pneumatic tire 4).

Furthermore, the application system 1 described above is particularly effective and efficient in all situations, insofar as it is able both to cope with unforeseen and accidental events (by virtue of the target value $P_{TRG}$ calculated by means of a feedback control), and to learn from experience in order to become more and more accurate (by virtue of the correction value $P_{COR}$, calculated by means of artificial intelligence algorithms such as neural networks).

In other words, within the application system 1 described above, the feedback control and the artificial intelligence act together in a synergistic way in order to always ensure minimal variability in the force F which is exerted by the pneumatic spring 16 upon the pressure roller 12 during the application of the layer of sealing agent 2.

LIST OF REFERENCE NUMBERS IN THE FIGURES 1 application system
2 sealing agent
3 inner surface
4 pneumatic tire
5 support device
6 axis of rotation
7 position sensor
8 camera
9 applicator unit
10 dispensing head
11 movement device
12 pressure roller
13 axis of rotation
14 support arm
15 axis of rotation
16 pneumatic spring
17 bracket
18 force sensor
19 control unit

The invention claimed is:

1. A method for applying a sealing agent to an inner surface of a pneumatic tire;
the method comprising:
   rotating, via a support device, the pneumatic tire about an axis of rotation;
   applying a layer of sealing agent to the inner surface of the pneumatic tire via a dispensing head arranged within the pneumatic tire;
   pressing, via a pressure roller, the layer of just applied sealing agent against the inner surface of the pneumatic tire;
   pushing the pressure roller against the layer of just applied layer of sealing agent via an actuator which generates a force having a desired value;
   determining, via a force sensor, a measured value of the force generated by the actuator; and
   cyclically varying the force generated by the actuator as a function of the measured value of the force.

2. The method of claim 1, wherein the force generated by the actuator is cyclically varied via a feedback control that follows the desired value.

3. The method of claim 2, further comprising:
   calculating a force error corresponding to a difference between the desired value of the force and the measured value of the force; and
   determining a target value for driving the actuator as a function of the force error.

4. The method of claim 3, further comprising:
   determining, via a position sensor, an angular position of the pneumatic tire about the axis of rotation;
   determining a correction value as a function of the angular position of the pneumatic tire; and
   determining an actuation value wherewith to drive the actuator in applying the correction value to the target value.

5. The method of claim 4, wherein the actuation value is determined in summing the correction value with the target value.

6. The method of claim 4, further comprising:
   storing within a memory a plurality of possible progressions of the correction value as a function of the angular position; and
   utilizing at least one of the plurality of possible progressions of the correction value stored within the memory to determine the correction value to be applied to the target value.

7. The method of claim 6, further comprising:
   also associating, with each progression of the correction value as a function of the angular position stored within the memory, a corresponding progression of the measured value of the force as a function of the angular position; and
   identifying, amongst all of the plurality of possible progressions of the measured value of the force as a function of the angular position stored within the memory, the progression of the measured value of the force that most closely resembles the progression of the measured value of the force supplied in real time by the force sensor, and subsequently utilizing the associated progression of the correction value in order to determine the correction value to be applied to the target value.

8. The method of claim 7, wherein an artificial intelligence algorithm is used to identify amongst all of the plurality of possible progressions of the measured value of the force as a function of the angular position stored within the memory the progression of the measured value of the force that most closely resembles the progression of the measured value of the force supplied in real time by the force sensor.

9. The method of claim 6, further comprising:
   also associating, with each progression of the correction value as a function of the angular position stored within the memory, a corresponding progression of the measured value of the force as a function of the angular position; and
   utilizing, in order to determine the correction value to be applied to the target value, the progression of the correction value having the progression of the measured value of the force that is most similar to the progression of the measured value of the force supplied in real time by the force sensor amongst all of the plurality of possible progressions of the measured value of the force as a function of the angular position stored within the memory.

10. The method of claim 1, wherein the actuator is a pneumatic device and wherein the elastic force is generated by a gas under pressure.

11. A system for applying a sealing agent to an inner surface of a pneumatic tire, the system comprising:
   a support device configured to rotate the pneumatic tire about an axis of rotation;

a dispensing head configured within the pneumatic tire to apply a layer of sealing agent to the inner surface of the pneumatic tire;

a pressure roller configured to press the layer of just applied sealing agent against the inner surface of the pneumatic tire;

an actuator configured to generate a force having a desired value in order to push the pressure roller against the just applied layer of sealing agent;

a force sensor configured to determine a measured value of the force generated by the actuator; and a control unit configured to cyclically vary the force generated by the actuator as a function of the measured value of the force.

12. The system of claim 11, wherein the control unit implements a feedback control that follows the desired value to cyclically vary the force generated by the actuator.

13. The system of claim 12, wherein the control unit is configured to:

calculate a force error corresponding to a difference between the desired value of the force and the measured value of the force; and determine a target value for driving the actuator as a function of the force error.

14. The system of claim 13, wherein the control unit is configured to:

determine, via a position sensor, an angular position of the pneumatic tire about the axis of rotation;

determine a correction value as a function of the angular position of the pneumatic tire; and determine an actuation value wherewith to drive the actuator in applying the correction value to the target value.

15. The system of claim 14, wherein the actuation value is determined in summing the correction value with the target value.

16. The system of claim 14, wherein the control unit is configured to:

store within a memory a plurality of possible progressions of the correction value as a function of the angular position; and utilize at least one of the plurality of possible progressions of the correction value stored within the memory to determine the correction value to be applied to the target value.

17. The system of claim 16, wherein the control unit is configured to:

also associate, with each progression of the correction value as a function of the angular position stored within the memory, a corresponding progression of the measured value of the force as a function of the angular position; and identify, amongst all of the plurality of possible progressions of the measured value of the force as a function of the angular position stored within the memory, the progression of the measured value of the force that most closely resembles the progression of the measured value of the force supplied in real time by the force sensor, and subsequently utilize the associated progression of the correction value in order to determine the correction value to be applied to the target value.

18. The system of claim 17, wherein an artificial intelligence algorithm is used to identify amongst all of the plurality of possible progressions of the measured value of the force as a function of the angular position stored within the memory the progression of the measured value of the force that most closely resembles the progression of the measured value of the force supplied in real time by the force sensor.

19. The system of claim 16, wherein the control unit is configured to:

also associate, with each progression of the correction value as a function of the angular position stored within the memory, a corresponding progression of the measured value of the force as a function of the angular position; and utilize, in order to determine the correction value to be applied to the target value, the progression of the correction value having the progression of the measured value of the force that is most similar to the progression of the measured value of the force supplied in real time by the force sensor amongst all of the plurality of possible progressions of the measured value of the force as a function of the angular position stored within the memory.

20. The system of claim 11, wherein the actuator is a pneumatic device and wherein the elastic force is generated by a gas under pressure.

* * * * *